(12) United States Patent
Smith et al.

(10) Patent No.: US 7,849,430 B2
(45) Date of Patent: Dec. 7, 2010

(54) REVERSE DONUT MODEL

(75) Inventors: Richard W. Smith, Fort Collins, CO (US); Hang Kwan, San Bruno, CA (US); Manzurul Khan, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 347 days.

(21) Appl. No.: 12/054,317

(22) Filed: Mar. 24, 2008

(65) Prior Publication Data
US 2009/0241081 A1 Sep. 24, 2009

(51) Int. Cl.
G06F 17/50 (2006.01)
G06F 9/45 (2006.01)

(52) U.S. Cl. .................................. 716/6; 716/1; 716/4

(58) Field of Classification Search .................. 716/1, 716/4, 6
See application file for complete search history.

(56) References Cited

U.S. PATENT DOCUMENTS

| | | | |
|---|---|---|---|
| 7,181,383 B1* | 2/2007 | McGaughy et al. | 703/14 |
| 7,460,986 B2* | 12/2008 | Douriet et al. | 703/2 |
| 7,483,825 B2* | 1/2009 | Van Huben et al. | 703/16 |
| 2002/0112221 A1* | 8/2002 | Ferreri et al. | 716/17 |
| 2007/0044051 A1* | 2/2007 | McGaughy et al. | 716/5 |

* cited by examiner

Primary Examiner—Stacy A Whitmore
Assistant Examiner—Magid Y Dimyan
(74) Attorney, Agent, or Firm—Martine Penilla & Gencarella, LLP

(57) ABSTRACT

A pruning algorithm for generating a reverse donut model (RDM) for running timing analysis for a block in an IC includes logic to reduce a hierarchical model of the IC to a single level flat model. A block from a plurality of blocks that make up the IC is identified from the single level flat model of the IC. The pruning algorithm is further used to initialize a timer and to define timing constraints associated with each of a plurality of input and output pins associated with the identified block. A RDM for the identified block is generated by identifying and including connectivity information associated with a plurality of input and output pins in an outer boundary of the identified block and at least one layer of interface connection between each of the plurality of input and output pins in the outer layer of the identified block and one or more circuit elements external to the identified block in the IC interfacing with each of the plurality of input and output pins in the identified block. The generated RDM acts as a blackbox for the identified block and is used in place of the identified block for running the timing analysis.

22 Claims, 6 Drawing Sheets

REVERSE DONUT MODEL

FIELD OF THE INVENTION

The present invention relates generally to performance analysis tools used in analyzing semiconductor device design, and more particularly to a pruning algorithm for generating a reverse donut model for running a timing analysis.

BACKGROUND

Description of the Related Art

With design complexity of an integrated circuit scaling upwards, it has become increasingly important to ensure that today's complex designs are free of any design violations. A common practice to ensure that complex designs are free of any design violations is to place them through performance analysis using a performance analysis tool. Typically, integrated circuit (IC) designs contain various components or circuit elements (flip-flops, latches, pins, logic gates, multiplexers, etc) arranged in hierarchical layers with interconnections. Components such as logic gates and multiplexers do not store bit values or state information and are generally referred to as combinatorial logic. On the other hand, components such as flip-flops and latches store state information and are commonly referred to as storage elements or sequential elements. A plurality of these components and their interconnections may form a block, such as a functional block. The interconnections provided with the functional block include interconnections to components within the block and to components outside the block within an IC.

The performance analysis tool is used to load the IC design, define physical constraints, provide exceptions and run the performance analysis. The exceptions are provided to override any default constraints during any time of the analysis. Some of the physical constraints that are considered important in the analysis are timing, area, power and port locations. Timing constraints are more difficult to provide since they depend on many external factors such as design planning, routing and integrations with other blocks. Thus, performing timing analysis is generally more prevalent than any other type of analysis in determining validity of the IC design. Properly administered timing analysis provides for faster and accurate design verification.

One traditional way of performing timing analysis of an IC design is to use timing constraints to propagate top level timing information down to lower level blocks. However, due to its limitations, timing constraints cannot generate accurate timing in lower level blocks as generated at a flat level model of the IC design. A flat level model is where the hierarchical model of the IC design is reduced to a single level wherein all the circuit elements and interconnectivity information for the circuit elements within and outside the blocks of the IC design are preserved. Due to an inability to generate accurate timing in lower level blocks, there is always a mismatch between the timing runs at the top level and at the flat level. Further, the timing constraints cannot be adjusted for skew due to lack of information on the exact locations of storage elements. As a result, the timing analysis with a hierarchical model gives an incomplete and inaccurate picture of the performance of the IC design.

Another option is to run a timing analysis with the flat level model. As the flat level model preserves all the elements including elements in blocks and interconnectivity information for all the elements, running a timing analysis on the flat level model provides a more complete and accurate picture of the performance of the IC design. However, establishing timing constraints and running timing analysis on this flat level model takes too long and is not economical.

It is in this context that embodiments of the invention arise.

SUMMARY

The present invention fills the need by generating a reverse donut model for a block in an Integrated circuit (IC) design. The IC design is then used to make a semiconductor chip. The reverse donut model (RDM) is used in performing analysis of the block within the IC design. The RDM enables running the design analysis in a fast and efficient manner without compromising the structural design of the IC. According to numerous embodiments, a reverse donut model is generated for a block in the IC by including connectivity information associated with an outer input-output (IO) pin layer of the block and one or more layers of external circuit elements which interface with each of a plurality of input or output pins in the IO pin layer of the block. The connectivity information associated with the external circuit elements includes one or more layers of external circuit elements stopping at a layer with a first storage element interfacing with each of the input or output pins of the outer IO pin layer of the block. The generated reverse donut model is used in place of the block in the IC design and analysis is run at the block level. The results of the timing analysis obtained at the block level with the RDM are substantially similar to the ones obtained when run with the actual block.

In one embodiment, a method for generating a reverse donut model (RDM) for a block in the IC design for running a timing analysis is disclosed. The method comprises flattening a design of the IC to reduce the hierarchical model of the IC to a single level flat model. The IC design includes a plurality of circuit elements, such as flip-flops, latches, pins, logic gates, multiplexers, etc., and a plurality of blocks made up of one or more of the circuit elements with interconnections between the circuit elements within and outside the blocks. A block from the plurality of blocks in the single level flat model of the IC is identified and a RDM is generated for the identified block. The generated RDM includes connectivity information associated with a plurality of input and output pins in the outer boundary of the identified block and at least one layer of interface connection between each of the plurality of input and output pins in the outer layer of the identified block and one or more circuit elements external to the identified block in the IC interfacing with each of the plurality of input and output pins in the identified block. The generated RDM preserves essential performance characteristics of the identified block. The generated RDM acts as a blackbox and is used in place of the identified block for running the timing analysis.

In another embodiment, a method for generating a reverse donut model (RDM) for a block in an integrated circuit chip (IC) is disclosed. In this embodiment, connectivity information associated with the hierarchical model of the IC is obtained. The connectivity information associated with the hierarchical model includes a plurality of circuit elements arranged in hierarchical layers and connectivity information associated with the plurality of circuit elements of the IC. In this embodiment, each block includes one or more sub-blocks and/or one or more circuit elements and interconnectivity information associated with the circuit elements including interconnections with other circuit elements both internal and external to the block. Each sub-block, in turn, includes one or more circuit elements and interconnectivity information associated with the circuit elements including interconnection with other circuit elements internal and external to the sub-blocks. The connectivity information is provided by a netlist. Parasitic data, such as resistance, capacitance, inductance and other related information, associated with the interconnections between the circuit elements of the IC are obtained from a detailed standard parasitic format (DSPF) file. The hierarchical model of the IC is flattened to a single level flat model using the information from the netlist and DSPF file. The single level flat model retains all the blocks, sub-blocks, circuit elements, connectivity and other related information of the IC. A block from the single level flat model of the IC is identified. The identified block includes an outer boundary with an input-output pin layer having a plurality of input and output pins to interface with both internal and external circuit elements of the identified block in the IC. A timer associated with the IC is initialized. A set of timing constraints associated with each of the plurality of input and output pins of the IC is defined. An RDM for the identified block is generated by retaining connectivity information associated with the IO pin layer in the outer boundary of the identified block and at least one layer of interface connection between each of the plurality of input and output pins in the IO pin layer at the outer boundary of the identified block and one or more circuit elements external to the identified block interfacing with each of the plurality of input and output pins in the IO pin layer of the identified block. The generated RDM preserves the essential performance characteristics of the identified block acts as a blackbox for the identified block. The generated RDM replaces the identified block in the IC design and is used for running the timing analysis.

In yet another embodiment a pruning algorithm for generating a reverse donut model (RDM) for a block within an integrated circuit chip (IC) is defined within a computer-aided design tool. The pruning algorithm includes a flattener module configured to flatten a hierarchical model of the IC to a single level flat model. The hierarchical model of the IC includes a plurality of circuit elements and blocks, with each block having one or more sub-blocks and circuit elements arranged in hierarchical layers and interconnections associated with the circuit elements. Each block includes an outer layer of input and output pins to interface with circuit elements both inside and outside the block in the IC. Each sub-block, in turn, includes a plurality of circuit elements. The single level flat model retains all connectivity and related information associated with each of the plurality of blocks within the IC. A block from the plurality of blocks in the single level flat model is identified for generating the RDM.

The pruning algorithm further includes a timer module configured to initialize timing constraints associated with the IC and to define a plurality of timing constraints associated with each of a plurality of input and output pins of the IC. The timing constraints provide the timing data related to the IC. A RDM generator module within the pruning algorithm is configured to interact with the flattener module to obtain connectivity and other related information for the identified block, interact with the timer module to obtain timing constraints associated with the identified block and to prune the single level flat model of the IC to create the RDM for the identified block using the connectivity information and timing constraints associated with the identified block. The RDM includes the connectivity information of an outer input-output (IO) pin layer of the block and at least one layer of interface connection between each of a plurality of input and output pins in the IO pin layer of the identified block and one or more first external circuit elements interfacing with each of the plurality of input and output pins. The generated RDM preserves essential performance characteristics of the identified block. The generated RDM acts as a blackbox for the identified block and is used in place of the identified block for running the timing analysis. The present invention, thus, describes method and apparatus for effectively generating a reverse donut model (RDM) of a block in an IC chip design. The generated RDM for the block includes only the essential circuitry information associated with outer boundary of the block having a plurality of input and output pins and one or more layers of connectivity information associated with external circuit elements interfacing with each of the plurality of input and output pins at the outer boundary of the block. The identified block is replaced by the generated RDM, which acts as a blackbox during timing analysis for the block. The generated RDM preserves essential performance characteristics of the identified block. The results obtained from the timing analysis for the block using the generated RDM is substantially equivalent to the results obtained when using the original block. The generated RDM enables timing analysis to run substantially faster as only essential layers of the block representing the complete block is used during analysis. Additionally, there is no need to provide block level timing constraints each time the analysis is run as the blackbox includes the timing constraints associated with each of the input and output pins that are substantially similar to the block level timing constraints. The embodiments of the invention provide a more robust timing analysis algorithm that is easier to implement while providing greater flexibility for varying a design within the block.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

Figure 1:
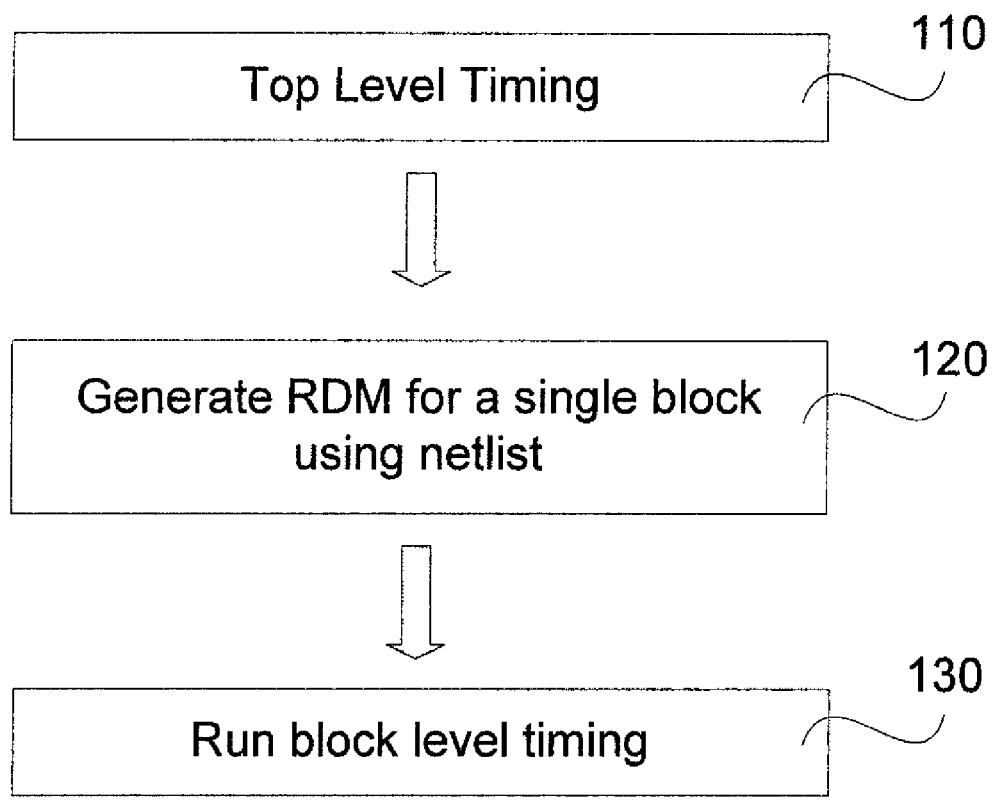
FIG. 1 illustrates a high-level reverse donut model flow, in one embodiment of the invention.

The present invention provides a pruning algorithm for implementation in a simulation tool to generate a reverse donut model (RDM) of a block within an integrated circuit (IC) design. The generated RDM is used in place of the block in the IC during timing analysis using the simulation tool. The RDM provides for a faster and more accurate analysis of the block within the IC than traditional algorithms and tools. In one embodiment of the invention, the approximate runtime for analyzing the IC using the RDM model is about 3 times faster than the time taken by the traditional method using the fully flattened model. The pruning algorithm includes logic to obtain connectivity and other parasitic data related information, such as capacitance, resistance, inductance etc. for a plurality of blocks in the IC from a netlist and a Detailed Standard Parasitic Format (DSPF) file. A hierarchical model of the IC is flattened to a single level flat model using the information from the netlist and DSPF file. The single level flat model includes all the components and information of the IC including a plurality of blocks, sub-blocks within each of the plurality of blocks and a plurality of circuit elements within each block and sub-block arranged in hierarchical layers and interconnections between the circuit elements inside and outside the sub-blocks and blocks. A block from the plurality of blocks in the IC is identified. The single level flat model is pruned so that only information associated with an outer boundary of the identified block and one or more layers of connectivity information to external circuit element (s) interfacing with the outer boundary of the block is retained in the RDM for the identified block. The RDM preserves the essential performance characteristics of the identified block and acts as a blackbox. The RDM is used in place of the original block during timing analysis.

The outer boundary of the identified block includes a layer of input and output pins that interface with the various circuit elements both inside and outside the identified block of the IC. During the creation of the RDM, a set of constraints, such as timing constraints, associated with the IC device is defined at each of the plurality of input and output pins of the outer boundary of the identified block and the RDM generated using these timing constraints for the identified block. The timing constraints at the respective input or output pin are obtained using logic, such as combinatorial logic, connected to each input or output pin at the identified block. A timing run at the IC device will generate a timing signal at each of the input or output pins. The corresponding logic at each pin will interpret the timing signal at the pin to arrive at a set of timing constraints for the pin. For instance, the logic at an input pin in the identified block will interpret the timing signal to arrive at a set of timing constraints, such as arrival time and slew rate. Slew rate, as used in this application, represents the maximum rate of change (difference between rise and fall) of a timing signal at a point, such as a pin, in the IC. Similarly, the logic at an output pin in the identified block will interpret the timing signal to arrive at another set of timing constraints, such as required time and capacitance/load. The timing constraints defined at each of the pins provide an accurate measure of the timing data associated with the identified block. The generated RDM acts as a blackbox and replaces the identified block when analysis is run at the IC.

There are many advantages of using the generated RDM in the IC device during timing analysis. The RDM significantly reduces the size of top-level design. The runtime to generate the RDM is a fraction of the analysis time. In one embodiment, the RDM for a micro-core within a core design is generated in about 7 hours which is a fraction of the time taken to run the analysis. The RDM correctly includes the outer flop boundary of a lower level design. The analysis time is substantially reduced at the block level since only essential layers providing all the critical data information associated with the block, such as timing data, are included in the RDM. RDM produces substantially same timing results at lower level block as the top level design. The variation of interface slack in "CLK" domain using the RDM is within ±1 pico second. Additionally, the RDM enables design changes within the identified block without having to undergo any design modifications to the RDM. There is no need to create block level constraints as the RDM provides the necessary timing related constraints for the block at each of the input and output pins.

To facilitate an understanding of the various embodiments, a simplified high level reverse donut model flow will now be described first with reference to FIG. 1. FIG. 1 illustrates an overview of high-level flow operations for generating a reverse donut model for an integrated circuit (IC) design. The process begins with running a top level timing run to determine the timing data associated with various blocks of an IC, as illustrated in operation 110. The IC includes a plurality of blocks across multiple levels and associated interconnectivity information. Each of the plurality of blocks may include one or more sub-blocks and one or more circuit elements. Each of the sub-blocks may include one or more circuit elements. The circuit elements that may be included in the IC device include a clock network pin, a combinatorial logic, such as logic gate or multiplexer, a storage element, such as a flip-flop or latch. In addition to these, the circuit element may include a blackbox of another sub-block or a block having a plurality of circuit elements including one or more storage elements. A netlist and DSPF file are used to obtain information related to the various circuit elements and interconnectivity among the various circuit elements of the IC. A netlist, as used in this application, is a textual representation of an electronic circuit of the IC and includes a list of various components (circuit elements) arranged in hierarchical layers and connectivity information between the various components. In one embodiment, the netlist is a hardware description language (HDL) file, such as a verilog file. A Detailed Standard Parasitic Format is an industry standard and includes parasitic data associated with interconnections in an IC device. The parasitic data include resistance, capacitance, inductance and other related data of the interconnections. The parasitic data is used in calculating signal delay and for ensuring integrity of a signal, both of which ultimately determine the speed of the IC device.

As a result, the top-level timing provides a list of all the components and interconnections corresponding to all the components in the IC. The list of components and interconnectivity information are used by a pruning algorithm to flatten the hierarchical model to a single level flat model that can be used in generating the reverse donut model for one or more blocks in the IC device. For instance, the pruning algorithm identifies a block from the single level flat model and goes around the identified block to identify each input and output pin at the outer layer, analyzes the single level flat model architecture to determine location of storage elements external to the block and interfacing with each input/output pin and circuit elements that need to be preserved or pruned. Based on this information, the pruning algorithm prunes all non-essential components and connectivity information from the single level flat model leaving behind only essential components and interconnectivity information for the identified block as a RDM, as illustrated in operation 120. The RDM preserves the essential performance characteristics of the identified block and acts as a blackbox for the identified block in the IC. The generated RDM is used in place of the identified block to run timing analysis, as illustrated in operation 130. The RDM provides substantially the same results as the identified block during timing analysis but at substantially less time.

Figure 2:
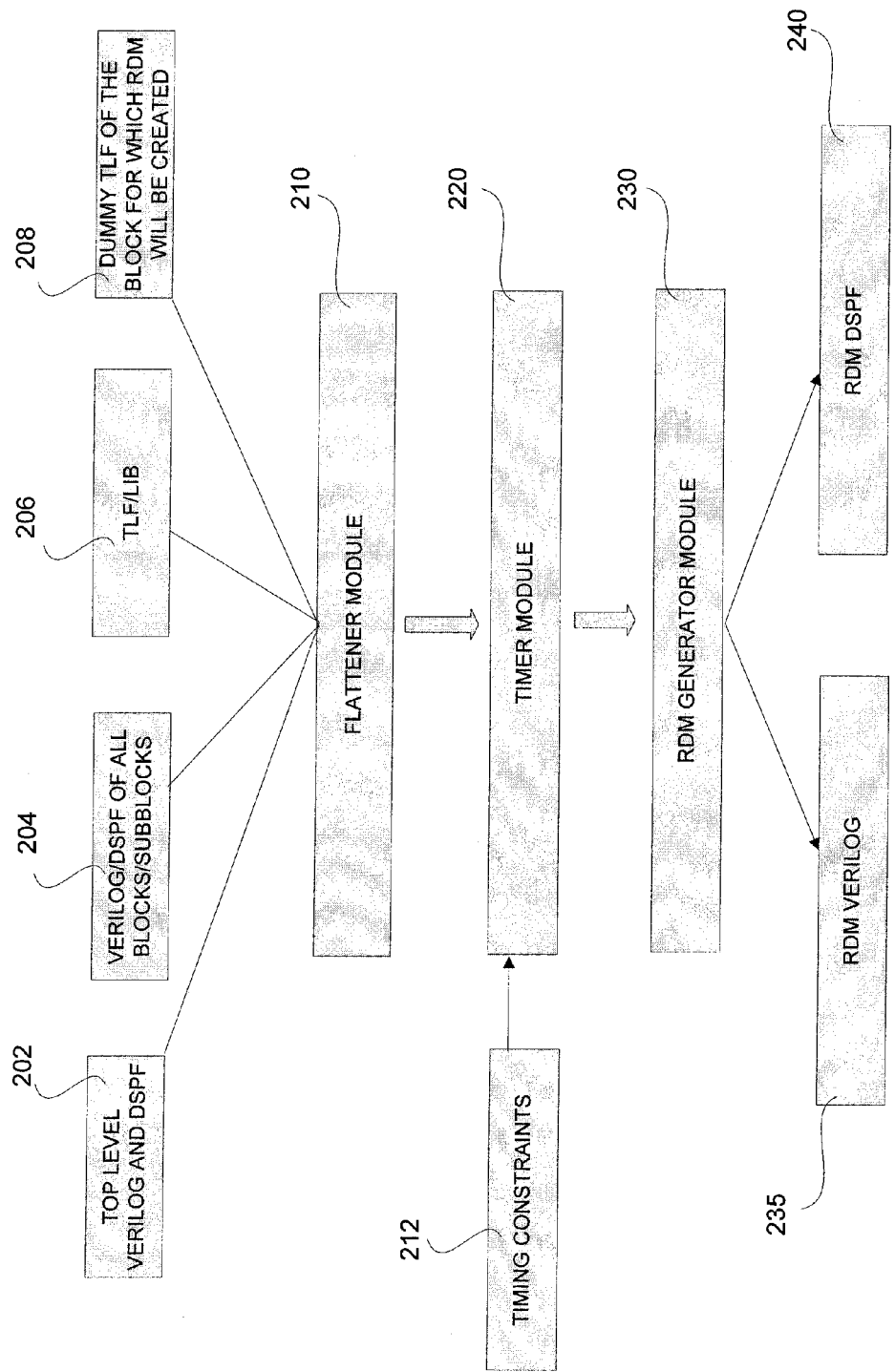
FIG. 2 illustrates a pruning algorithm for generating a reverse donut model of a block within an IC, in one embodiment of the invention.

FIG. 2 illustrates various components of a pruning algorithm and various inputs that interact with the components of the pruning algorithm used in generating a reverse donut model for a block in an integrated circuit (IC). The pruning algorithm may be a software code developed with Tool Command Language (TCL) interface and includes various software components with logic to identify a block, identify the circuit elements and interconnections associated with the identified block and generate a RDM for the identified block. The various software components of the pruning algorithm include a flattener module 210, a timer module 220 and a Reverse Donut Model generator module (generator module) 230. The flattener module 210 interacts with a plurality of inputs, such as a top-level verilog and DSPF file 202 to obtain all the components and interconnections associated with the top level of the IC design. As mentioned earlier, the verilog file is a hardware descriptor language (HDL) file that provides information associated with various components and interconnections that make up the IC. The DSPF file provides the parasitic data information associated with the interconnections to the various components that make up the IC and is used to determine signal delay and signal integrity at the top level.

The IC includes a plurality of blocks with each block having one or more sub-blocks and one or more circuit elements. Each of the sub-blocks, in turn, includes one or more circuit elements. Each of the sub-blocks may spawn multiple levels and the interconnections provide connectivity information for the circuit elements within and outside of each sub-block. Similarly, each of the blocks may include one or more sub-blocks spawning multiple levels with interconnections providing connectivity information within and outside each block. Each of the blocks includes an outer boundary comprising an input-output (IO) pin layer. The IO pin layer includes a plurality of input and output pins with each input/output pin interfacing with one or more circuit elements within or outside the block. The flattener module identifies a block from the plurality of blocks for which an RDM is to be generated and interacts with netlist, such as verilog, and DSPF files associated with all blocks and sub-blocks 204 to obtain a list of circuit elements and interconnectivity information associated with each of the blocks and sub-blocks other than the identified block and associated sub-blocks.

The flattener module 210 accesses a Timing Library Format/Library (TLF/LIB) file 206 for the top level to obtain timing related data associated with the top-level design of the IC. A TLF/LIB file is typically a textual representation of the timing and power parameters (timing data) associated either with a top-level or with one or more blocks in the IC. The timing data is used to calculate input-output delays, timing check values and interconnect delays for the related components of the IC. For instance, the TLF/LIB file for a top level provides top level timing data and a TLF/LIB file for a block provides block level timing data. The TLF/LIB of both the top IC device level and block level include information such as input/output pin information for the respective component (IC device or block), timing arc information from input to a first level storage element at a block or IC device, etc. The TLF/LIB is used to trace the circuitry outside a block to obtain just the input/output pin information associated with the block for generating the RDM for that block. The input/output pin information will enable identification of external storage elements interfacing with each input/output pin for the block so that the RDM can be generated up to the first external storage element. The flattener module 210 obtains timing data related to the identified block from a corresponding TLF/LIB file. In the case where a TLF/LIB file is not available for the identified block, then the timing data is obtained from a dummy TLF/LIB file. A software program is used to generate a dummy model wherein timing delay can be specified at each of the input/output pins. In one embodiment, the timing delay is specified to be half of the target cycle time and the dummy TLF/LIB file generated using the specified timing delay.

The flattener module 210 uses the information from the respective verilog, DSPF and TLF/LIB files and reduces the hierarchical model to a single level flat model of the IC. In one embodiment, the hierarchical model is reduced to a basic library element level. The single level flat model retains all the information associated with blocks, sub-blocks and circuit elements (components) and the corresponding interconnectivity information of the IC.

The timer module 220 in the pruning algorithm is used to obtain timing constraints associated with the IC device. The timing constraints obtained is for the top level of the IC device and is propagated to all the blocks and sub-blocks in the lower level of the IC device. For the identified block for which the RDM is being generated, the timer module 220 defines a set of timing constraints. In order to define timing constraints for the identified block, the timer module 220 first initializes a timer, such as timing engine. The timer module 220 identifies each of the plurality of input and output pins in the outer boundary of the identified block and defines timing constraints for each of the input and output pins. A timing run using the timing constraints at the IC device level is used to define timing constraints at each of a plurality of input and output pins at an outer boundary of each of the blocks. The defined timing constraints for the identified block are used in the generation of the RDM for the block. In this embodiment, the defined timing constraints override any previously existing timing constraints for the identified block.

The RDM generator 230 uses the information from the verilog, DSPF and TLF/LIB files from the flattener module 210 and timing constraints from the timer module 220 to prune the single level flat model of the IC to generate the RDM for the identified block. The single level flat model is pruned in such a way as to identify and preserve the IO pin layer at the outer boundary of the identified block. In addition to the IO pin layer at the outer boundary, at least one layer of interconnectivity information associated with first circuit elements external to the identified block and interfacing with each of the input/output pins at the IO pin layer of the identified block is also preserved. The first external circuit element interfacing with which each of the input and output pins may be a flip-flop, latch, pin, logic gate, multiplexer, a blackbox with a plurality of circuit elements contained therein, etc. The number of layers of interconnectivity information preserved during pruning depends on the first external circuit element. For instance, if the first external circuit element that directly interfaces with an input or output pin is a non-storage element, then additional layers of interconnectivity information are preserved leading up to and including the layer with a storage element with which an input/output pin interfaces. In this instance, the input or output pin in the outer IO pin layer indirectly interfaces with the storage element through the first external circuit element. If, for instance, the first external circuit element that an input or output pin directly interfaces is a storage element, then the connectivity information will include the interconnectivity information of the layer in which the storage element is present. The pruned model is extracted as the RDM and acts as a blackbox for the identified block. The extracted RDM includes a pruned RDM verilog file 235 and a pruned RDM DSPF file 240. A blackbox, as used in this application, is defined as a logical block representation of an original block whose inner components and operations are not known but which produces essentially same performance characteristics as the original block.

The RDM generator 230 in the pruning algorithm may engage a plurality of rules while pruning the single level flat model to obtain the RDM. The rules for pruning and generation of a reverse donut model for any block in the IC is described in detail with reference to FIG. 4. The identified block may be replaced by the RDM by simply replacing the verilog and DSPF files of the identified block with the pruned RDM verilog 235 and pruned RDM DSPF 240 files, respectively, in the IC design. The RDM acts as a blackbox and provides substantially same results as the identified block when the timing analysis is run at the identified block.

Figure 3A:
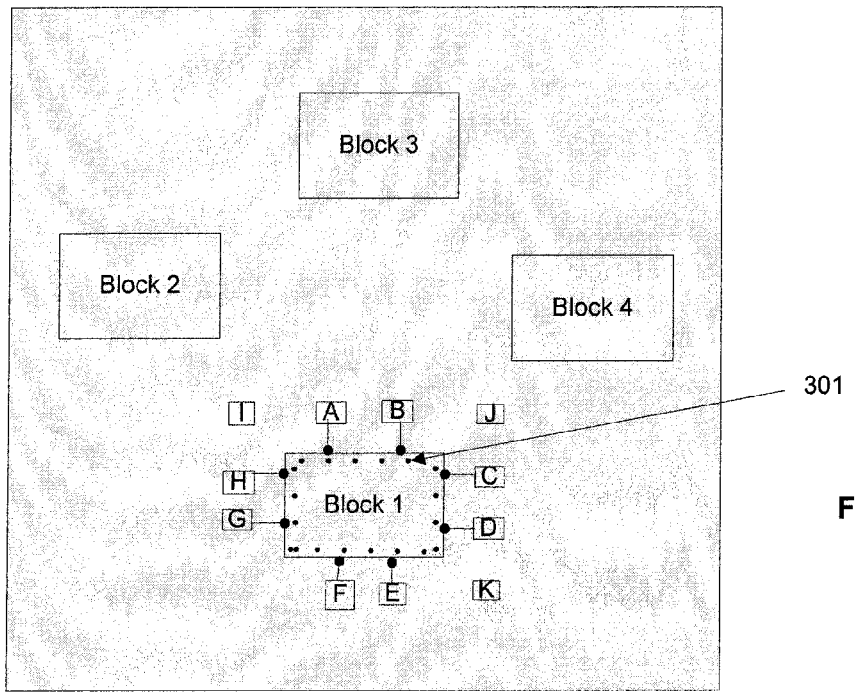
FIGS. 3A and 3B illustrate a reverse donut model generated for a block with in an IC, in one embodiment of the invention.
Figure 3B:
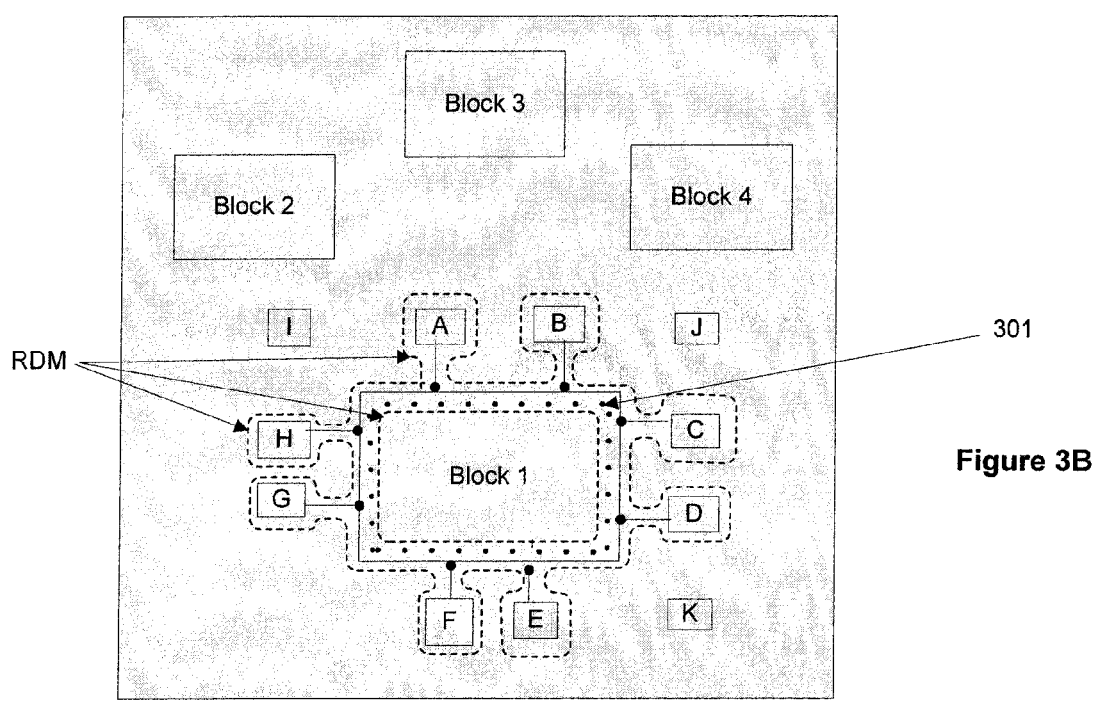

FIGS. 3A and 3B illustrate a block diagram of various components and connectivity information associated with an IC device used in generating a reverse donut model, in one embodiment of the invention. FIG. 3A illustrates a circuit model of an integrated circuit (IC) device. The IC device may include a plurality of blocks with each block spawning multiple levels. For example, the IC device may be a multi-core CPU with each core represented as a block. In this example, the CPU may include four cores, core 1 (Block 1), core 2 (Block 2), core 3 (Block 3) and core 4 (Block 4). It should be noted that the IC may include a plurality of blocks and is not restricted to the four blocks represented in FIG. 3A. In addition to the blocks, the IC may also include a plurality of circuit elements and sub-blocks, A-K, external to the blocks and interfacing with one or more blocks. Each of the blocks includes an outer layer of input-output pins 301 interfacing with a plurality of circuit elements both inside and outside the respective blocks. A block, block 1, from the IC is identified for generating a reverse donut model, as illustrated in FIG. 3A. The external circuit elements/sub-blocks that interface with each of the IO pins of the identified block, block 1, include circuit elements/sub-blocks A-H. Although additional circuit elements/sub-blocks, I, J and K, are available in the IC, these circuit elements/sub-blocks are not part of the generated RDM for the identified block as these circuit elements do not interface with any of the input or output pins of the identified block.

FIG. 3B represents the portion of the identified block and IC device circuit that is part of the generated RDM for the identified block. The generated RDM includes the outer IO pin layer of input/output pins 301 of the identified block, Block 1, and interconnectivity information between each of the plurality of input/output pins of the identified block and external circuit elements, A-H. The interconnectivity information for the RDM may include one or more layers of external circuit elements extending up to a layer that includes a first storage element. In the embodiment of FIG. 3B, each of the external circuit elements A-H may be a storage element or may include one or more circuit elements including a first storage element and one or more layers of interconnectivity information leading up to the first storage element. In one embodiment, each of the storage elements, which interface with each of the plurality of input/output pins, is a flip-flop. The generated RDM preserves the essential performance characteristics of the identified block. The generated RDM acts as a blackbox for the identified block and is used in place of the identified block when running timing analysis for the IC. It should be noted that the IC design may include a plurality of such RDMs representing plurality of blocks and the timing analysis run with such IC will run substantially faster and produce substantially the same results as when run with the original blocks.

Figure 4:
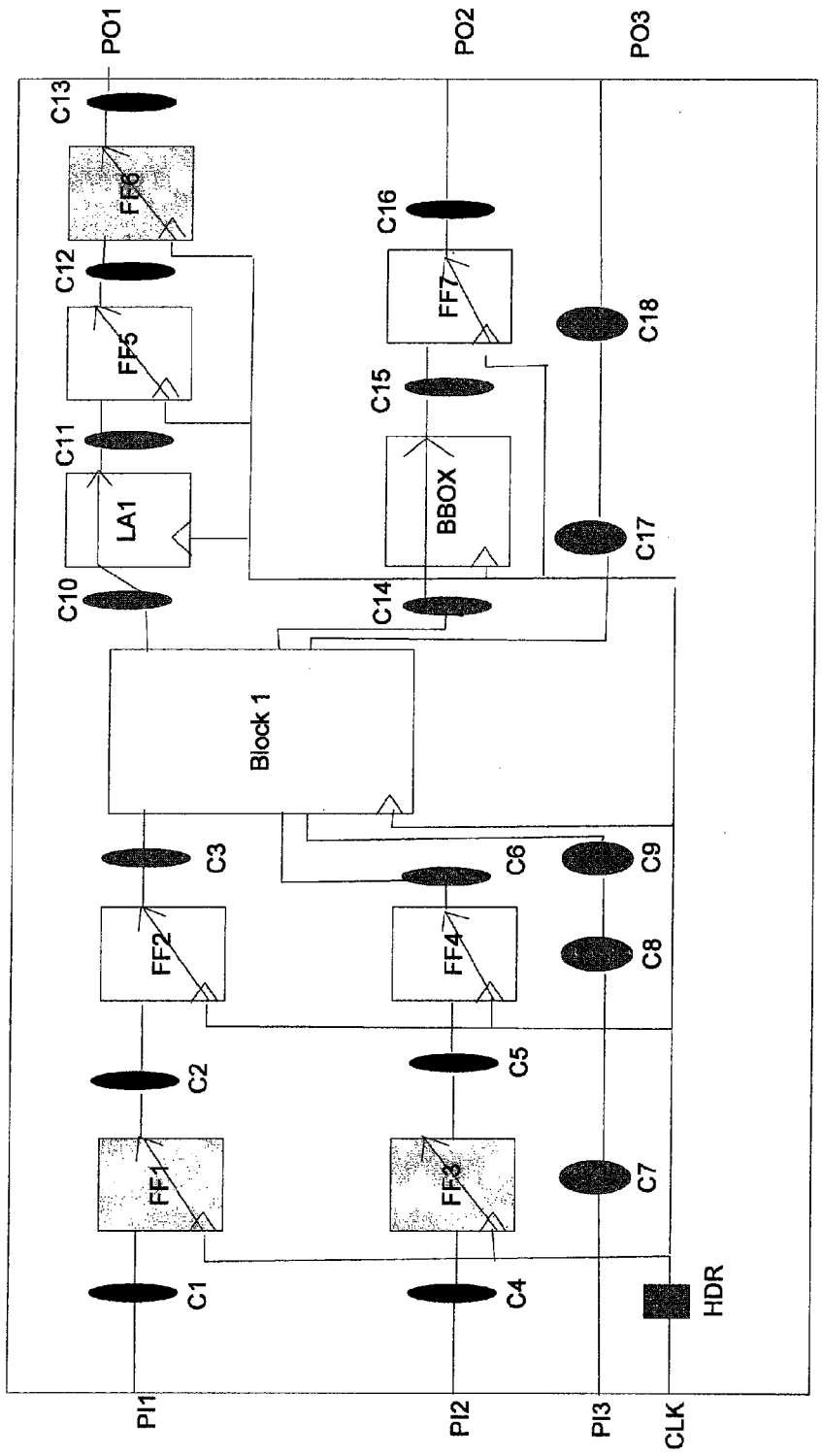
FIG. 4 illustrates a detailed process flow for generating a reverse donut model for a block within the IC, in one embodiment of the invention.

FIG. 4 illustrates a portion of a single level flat model of the IC device used in the generation of a reverse donut model for a block in the IC device. The pruning algorithm includes a plurality of rules for properly pruning the single level flat model of the IC device so as to include only the essential circuit elements and interconnectivity information for the RDM, in one embodiment of the invention. As mentioned earlier, the IC device may include a plurality of blocks with each block spawning multiple levels. For example, the IC device may be a multi-core CPU with each core represented as a block. In this instance, the CPU may include four cores, core 1 (Block 1), core 2 (Block 2), core 3 (Block 3) and core 4 (Block 4). In order to run the RDM generator, the original hierarchical level of the IC device is reduced to a single level flat model using netlist, such as verilog, and DSPF file. In one embodiment, the single level flat model is reduced to a basic library element level. The library element, in this embodiment, is the fundamental building element of the IC device. FIG. 4 illustrates a flattened representation of a portion of the IC device with a single core, Block 1 along with a plurality of external circuit elements that interface with Block 1.

The RDM generator uses a set of pre-defined rules to prune the single level flat model of the IC to obtain a pruned RDM for a block. In the embodiment illustrated in FIG. 4, a RDM generator identifies core 1 (Block 1) as the core for which the RDM is being generated. Accordingly, an outer boundary of Block 1 is preserved. The outer boundary includes an input-output pin layer with a plurality of input and output pins for interfacing with various elements both inside and outside of Block 1. Some of the rules that are used in preserving the interconnectivity information associated with Block 1 are outlined herein. External flop boundary (FF2, FF4) will be preserved. All the combinatorial logic (C3, C6) connecting Block 1 to the external flop boundary FF2, FF4 will be preserved. All the nets connecting Block 1 interfaces to the external boundary flops FF2, FF4 will be preserved. The external latch boundary (LA1) of Block 1 will be preserved. Although latch is considered a storage element, the latch switches between a stored state and a pass-through state. As a result, for embodiments of the invention, the latch is not strictly considered a storage element. The combinatorial logic (C10) connected to output of the latch (LA1) will be preserved. Combinatorial logic (C11) and external boundary flop (FF5) connected to output of the latch LA1 will be preserved. It should be noted that as the flop is a storage element, the pruning algorithm preserves all the layers of connectivity information leading up to and including the flop element. A blackbox (BBOX) at the external boundary of Block 1 will be preserved. This blackbox may include a storage element within. However, the storage element within blackbox is not a storage element directly interfacing with the Block 1 but is within the blackbox and interfacing through one or more of circuit elements. As a result, additional layers of connectivity information leading up to and including a storage element will be preserved. Thus, gate (C15) and external boundary flop (FF7) connected to the output of the blackbox (BBOX) will be preserved if there is a combinational arc from input to the output of the blackbox. Clock network driving all preserved sequential cells will be preserved along with side loads of a clock driver. All the side loads will be preserved. The flops (FF1, FF3 and FF6) will be pruned as they are outside the interconnectivity layers of a first storage element interfacing with an input or output pin of Block 1. In order to preserve the load on the clock pin, each pruned flop will be replaced by an equivalent input capacitance of the clock pin. As a result, individual capacitances equivalent to the ones exhibited by the pruned flops FF1, FF3 and FF6 will replace the respective pruned flops. As the flops FF1, FF3 and FF6 are being pruned, the corresponding combinatorial logic C1, C2, C4, C5, C12, C13 and C16 will also be pruned from the single level flat model leading to a RDM with only essential circuitry of the single level flat model. Additionally, as the load on the clock pin is maintained, the resulting RDM essentially exhibits all the characteristics of the original block. The identified block is replaced by the resulting RDM in the IC device and provides substantially same results as the original block when a timing analysis is run.

Figure 5:
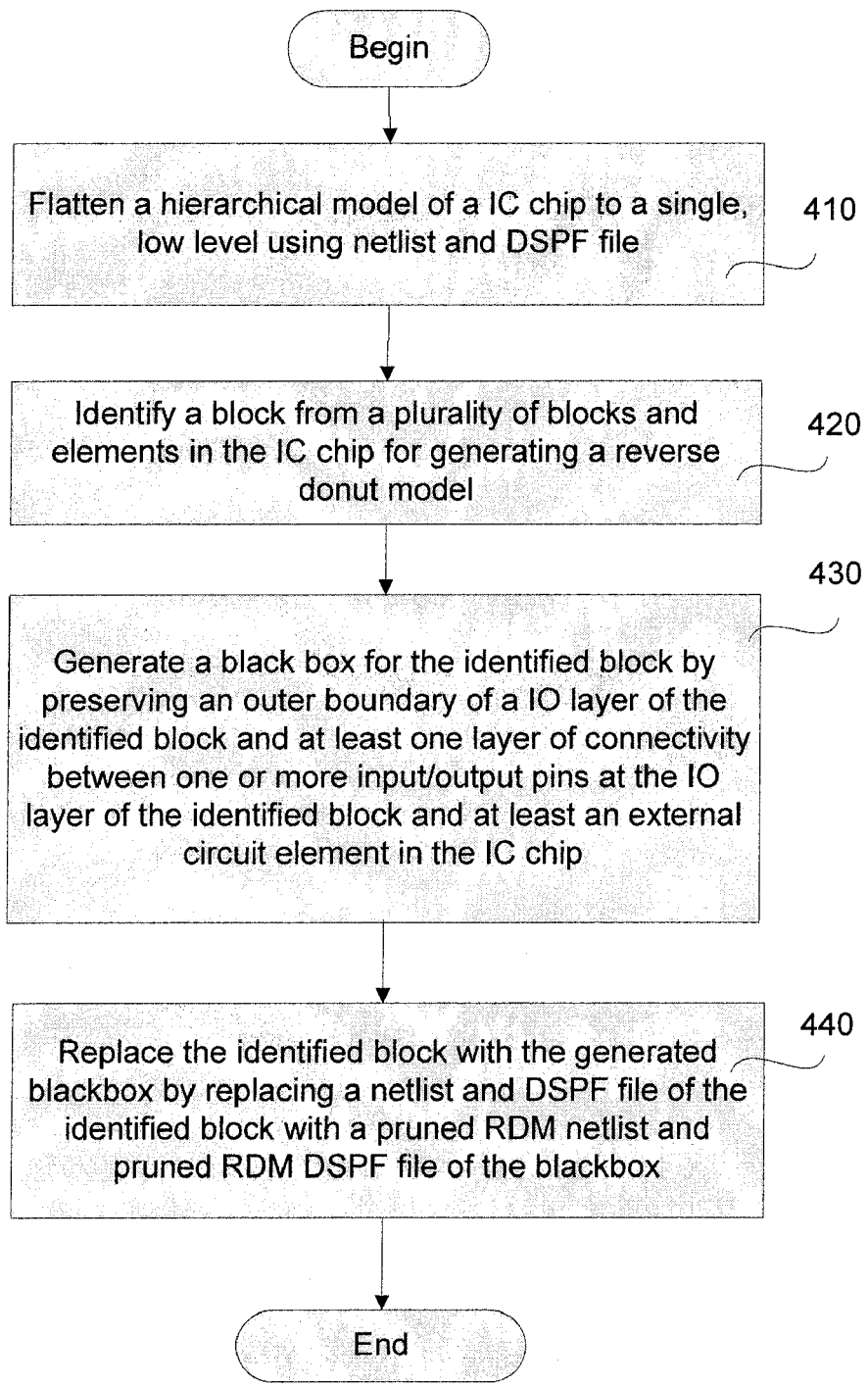
FIG. 5 illustrates process operations for generating a reverse donut model for a block, in one embodiment of the invention.

With the above detailed description of the pruning algorithm, the process used in generating an RDM will now be described with reference to FIG. 5. FIG. 5 illustrates the flow operations involved in generating the RDM for a block in the IC device. The process begins at operation 410 wherein a hierarchical model of an IC chip is flattened to a single level flat model using netlist and DSPF file. The hierarchical model having a plurality of blocks, with each block having a plurality of sub-blocks, with each sub-block having a plurality of circuit elements, is reduced to a basic library element level, in one embodiment of the invention. A block from the plurality of blocks is identified, as illustrated in operation 420. The block might be a core in a multi-core CPU or may be a functional block with in a single core. A reverse donut model (RDM) is generated for the identified block by including an outer boundary of the identified block, as illustrated in operation 430. The outer boundary includes an input-output (IO) pin layer with a plurality of input and output pins interfacing with circuit elements within and outside of the identified block. In addition to the outer boundary, the RDM also includes one or more layers of connectivity between each of the input/output pins at the IO pin layer of the identified block with circuit elements in the IC device external to the identified block. The process concludes with the generated RDM acting as a blackbox. The generated RDM preserves essential performance characteristics of the identified block. The generated RDM replaces the identified block in the IC design so that timing analysis may be run using the generated RDM, as illustrated in operation 440.

Figure 6:
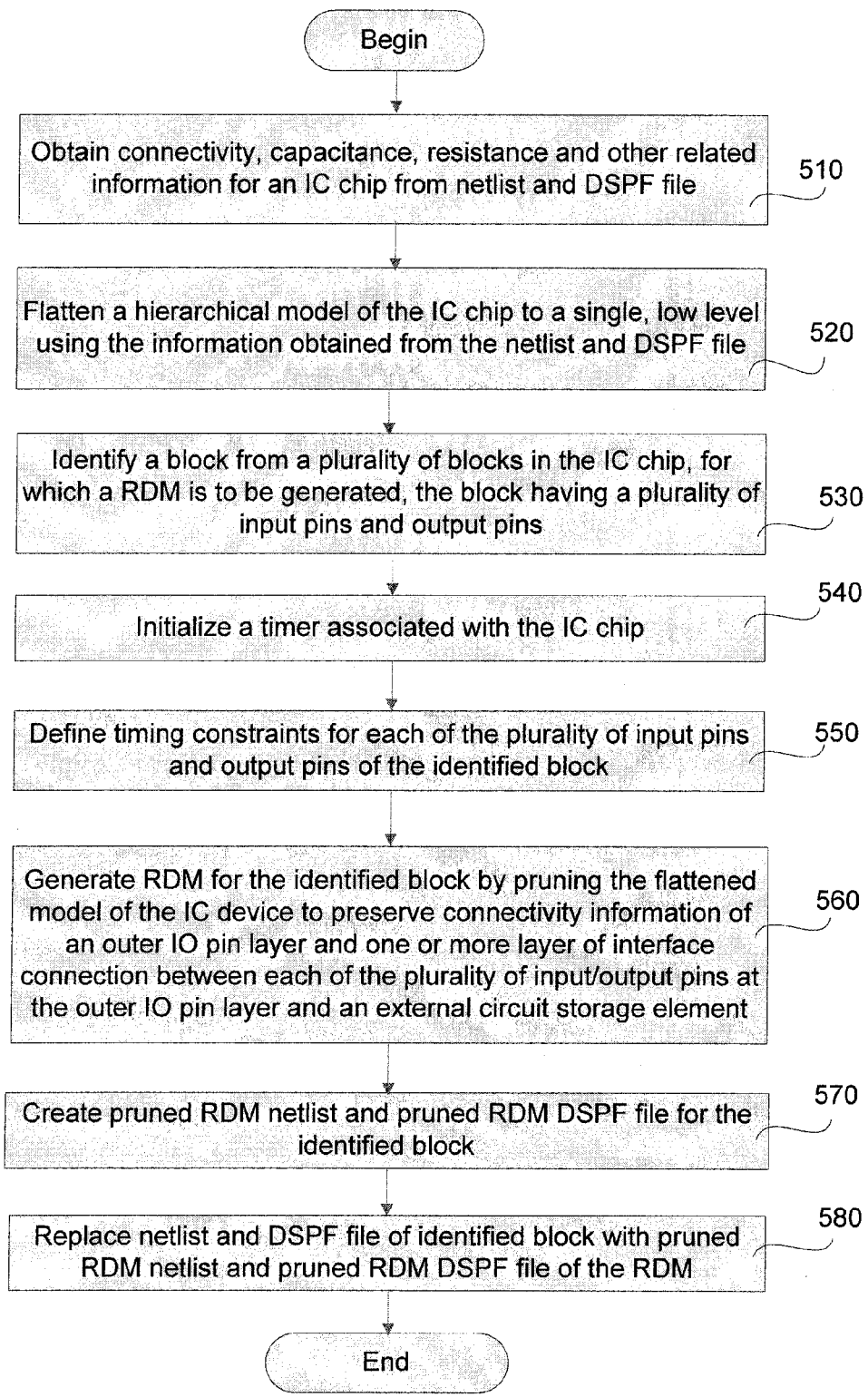
FIG. 6 illustrates process operations for generating a reverse donut model for a block, in an alternate embodiment of the invention.

FIG. 6 illustrates process flow operations involved in generating a reverse donut model for a block with in the IC device, in an alternate embodiment of the invention. The process begins at operation 510 wherein a list of circuit elements along with connectivity information is obtained using a netlist, such as a verilog. Additionally, parasitic data associated with interconnectivity, such as capacitance, resistance, inductance and other related information for all the circuit elements are obtained from a Detailed Standard Parasitic Format (DSPF) file. The IC device includes a plurality of circuit elements arranged in hierarchical layers with interconnectivity spawning multiple layers. The circuit elements may be arranged in a plurality of blocks with each block having one or more sub-blocks and one or more circuit elements, with each sub-block having one or more circuit elements. The hierarchical model of the IC is flattened using information obtained from the netlist and DSPF file, as illustrated in operation 520. The flattening of the IC device reduces the hierarchical model to a single level flat model with all the elements and interconnectivity information preserved. The single flat model may be reduced to a basic level, such as a library element level. A block from the plurality of blocks is identified, as illustrated in operation 530. The block includes, aside from various circuit elements, an outer boundary of IO pin layer with a plurality of input and output pins that interface with circuit elements both inside and outside the identified block.

A timer associated with the IC device is initialized, as illustrated in operation 540. A set of timing constraints are defined for each of the plurality of input and output pins in the identified block, as illustrated in operation 550. The timing constraints are defined at each of the plurality of input and output pins by performing a timing run using the timing constraints at the IC device level. The timing signal received at each of the input/output pins of the identified block is interpreted using a combinatorial logic associated with each input/output pin to define the timing constraints at the respective input/output pin. The timing constraints associated with each of the plurality of input and output pins overrides any previously defined timing constraints. A RDM is generated for the identified block from the single level flat model of the IC device by carefully pruning the circuit elements such that only the outer IO pin layer with the plurality of input and output pins are preserved along with connectivity information associated with connections between each of the input and output pins at the outer IO pin layer and circuit elements external to the identified block up to and including a first storage element, as illustrated in operation 560. The pruning of the single level flat model creates a pruned netlist and pruned DSPF file for the identified block, as illustrated in operation 570. The identified block is replaced by the RDM by replacing a netlist and DSPF file associated with the identified block with the pruned RDM netlist and pruned DSPF file of the identified block, as illustrated in operation 580. The generated RDM preserves essential performance characteristics of the identified block. The RDM acts as a blackbox and is used to run the analysis for the block. The analysis results obtained from the generated RDM are substantially equivalent to analysis results obtained with the original block.

Thus, the embodiments of the invention define a way for generating a reverse donut model (RDM) for a block in the IC device that can be used to perform analysis of the block. Although the embodiments of the invention have been explained with replacing a single block with a corresponding RDM for that block, it should be understood that the plurality of blocks in the IC device may be replaced by corresponding RDMs generated for the respective block. The timing analysis performed using such modified IC provides for a faster analysis of the IC design without compromising on the structure or integrity of the IC. Using the RDMs, the size of the top level design of the IC device is reduced significantly. Further, any changes to the design within a block will not result in changes to the corresponding RDM so long as the outer IO layer and the external interface are not affected by the changes within the block. As a result, the pruning algorithm provides a more flexible yet robust tool in generating effective RDMs that aid in faster analysis of the IC design.

The pruning algorithm may be a software code developed with Tool Command Language (TCL) interface. Prior to running the pruning algorithm, the verilog, DSPF and TLF/LIB files for the IC device must be loaded into a performance analysis (simulation) tool. A timer associated with the performance analysis tool must be initialized and timing constraints must be defined. Sample TCL commands available to support RDM feature are listed below as Appendix A.

APPENDIX A timingmodel GenerateRDM
- instName ,instance Name.:Inst name for which RDM is created.
- tlfData <tlf Data Name> :Timing annonted data name
[-dumpCells] : Collect cells used in RDM.
[.stats] : Report statistic
[-ignore_ports <>] : Ignore specified ports while marking the netlist
[-markNode <>] : Mark node or list of node externally
[-include_input_ports <>] : Include ports while doing the marking
[-include_output_ports <>] : Include ports while doing the marking
timingmodel getModelData
    -cells|ports :collect name of the cells used in RDM and
        store them in TCL list.

APPENDIX A-continued

/ collect name of the top level ports, that will require
constraint, and store them in TCL list
In order to collect the name of cells used in RDM using
command "t imingmodel getModelData -
cells" ,generateRDM needs to be run with -dumpCells option.

An example of the command file for Timing-RDM generation is listed below as Appendix B.

APPENDIX B

A sample Command file for generating timing-RDM

```
##############################################################
# Oyster Command file for timing
##############################################################
set output output.RDM
set toolprefix oyster
source_load timingmodel -debug
source_load daisToolKit -debug
setLog $output/log
setLogLevel -level debug
setConsoleLevel -level debug
set ctx [dais::createContext c1 Logic DaisVL_structAbs]
set topCellName " test"
#####################
# Timing Models (TLF) #
#####################
set DaisRW::tlf::context $ctx
set DaisRW::tlf::topCellName " test"
set DaisRW::tlf::dontUseTlfLibName "t rue"
set DaisRW::tlf::annotateName tlfData
set DaisRW::tlf::IgnoreDupModel " true"
dais::readTlf -inFile input/gates.tlf
dais::readTlf -inFile input/latchA.tlf
dais::readTlf -inFile input/latchB.tlf
dais::readTlf -inFile input/bbox.tlf
###################
# Design (Verilog) #
###################
set DaisRW::verilog::context $ctx
dais::readVerilog -inFile input/test.v
###################
# Parasitics (DSPF) #
###################
set DaisRW::dspf::ignoreInstSect "t rue"
set DaisRW::dspf::ignoreParaSection "f alse"
set DaisRW::dspf::ignoreParaInstComment "t rue"
set DaisRW::dspf::topCellName " test"
set DaisRW::dspf::context $ctx
set DaisRW::dspf::serviceName "D spiceDspfRW"
set DaisRW::dspf::toleranceMode "t rue"
set DaisRW::dspf::annotateName " PARASITIC_DATA"
dais::readDspf -inFile input/test.dspf
setunits -time -units ps -format 6.1
SetUnits -cap -units ff -format 6.1ff
$toolprefix InitTimer -design $ctx -tlf $ctx -tlf_data
tlfData -dspf_data PARASITIC_DATA test
$toolprefix setoptions -ic false
$toolprefix setoptions -dc false
$toolprefix SetOptions -pearl-compatible true
$toolprefix setoptions -chkp none
$toolprefix defineclock -cycle_time 500 -edges 0 250 -node clk clk
$toolprefix defineconstraint -constant vdd 1
$toolprefix defineconstraint -constant vss 0
$toolprefix report -nodes > $output/node-report
timingmodel GenerateRDM -dstViewName
" DaisVL_structAbs" -debug -tlfData "t lfData" -
instName " BBOX"
puts " writing GBOX verilog"
set DaisRW::verilog::context $ctx
set DaisRW::verilog::topCellName " $topCellName"
set DaisRW::verilog::topViewName " DaisVL_structAbs"
set DaisRW::verilog::outFile " $output/$topCellName.RDM.vL"
set DaisRW::verilog::recursiveWrite true
dais::writeVerilogTop
puts " writing GBOX dspf"
```

APPENDIX B-continued

A sample Command file for generating timing-RDM

```
set DaisRW::dspf::writeType " TOP"
set DaisRW::dspf::context $ctx
set DaisRW::dspf::outFile " $output/$topCellName.RDM.dspf"
set DaisRW::dspf::topCellName " $topCellName"
dais::writeDspf - annotateDataName "P ARASITIC_DATA"
quit
```

It will be obvious to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a reverse donut model (RDM) for an IC chip (IC) with a computer-aided design tool (CAD tool) for running a timing analysis, the method comprising:

flattening a design model of the IC, the flattening of the design model reducing a hierarchical model of the IC to a single level flat model, the design model of the IC including a plurality of circuit elements arranged in a plurality of blocks and sub-blocks;

identifying a block from the plurality of blocks in the single level flat model of the IC; and generating the RDM for the identified block, the generated RDM including connectivity information associated with an outer boundary of the identified block and at least one layer of interface connection between the outer boundary of the identified block and at least one external circuit element of the IC interfacing with the outer boundary of the identified block, the generated RDM preserving essential performance characteristics of the identified block and acting as a blackbox for the identified block, the generated RDM used in place of the identified block for running the timing analysis, wherein the generating of the RDM further includes pruning the single level flat model of the IC, and wherein the method operations are performed using a processor.

2. The method of claim 1, wherein flattening a design model of the IC further comprises:

obtaining connectivity information associated with the hierarchical model of the IC from a netlist, the connectivity information including connectivity information associated with the plurality of circuit elements associated with each of the plurality of blocks of the IC;

obtaining parasitic data associated with interconnections between the plurality of circuit elements of the IC from a detailed standard parasitic format (DSPF) file, wherein the parasitic data includes resistance, capacitance, inductance and other related data associated with the interconnections between the plurality of circuit elements; and reducing the hierarchical model of the IC to the single level flat model using the netlist and DSPF file of the IC, the single level flat model retaining all the blocks, circuit elements, interconnectivity and other related information of the IC.

3. The method of claim 2, wherein reducing the hierarchical model to a single level flat model is to reduce the hierarchical model to a library element level.

4. The method of claim 2, wherein the external circuit element is one of clock network pin, combinatorial logic including logic gate and multiplexer, a storage element including flip-flop and latch, a blackbox of another block or sub-block, wherein the blackbox of another block or sub-block including one or more storage elements within with a combinatorial arc connecting input and output of the blackbox.

5. The method of claim 4, further including, initializing a timer associated with the IC;

defining a plurality of timing constraints for the IC using the timer, the timing constraints replacing any existing timing constraints of the IC, the timing constraints used in generating the RDM.

6. The method of claim 5, wherein pruning the single level flat model of the IC further including:

identifying an outer input-output (IO) pin layer in the outer boundary of the identified block using the netlist, the IO pin layer having a plurality of input and output pins for interfacing with circuit elements both inside and outside the identified block, wherein the netlist provides input and output logic associated with each of the plurality of input and output pins in the IO pin layer;

identifying one or more external circuit elements interfacing with each of the plurality of input and output pins of the identified block using the netlist;

pruning the single level flat model of the IC to preserve the connectivity information associated with the outer IO pin layer of the identified block and one or more layers of interface connection between each of the plurality of input and output pins in the outer IO pin layer of the identified block and a first external circuit element, wherein the first external circuit element is a storage element, the pruning performed using information from the netlist, DSPF file and timing constraints of the IC.

7. The method of claim 6, wherein the storage element is a flip-flop.

8. The method of claim 6, wherein if the first external circuit element is one of a latch or a non-storage element, then the pruning further including, identifying at least one of an input or an output pin of the identified block having interface with the first external circuit element;

identifying a second external circuit element interfacing with the identified input or output pin of the identified block; and preserving connectivity information between the identified input or output pin in the outer IO pin layer of the identified block and the second external circuit element, the connectivity information spanning one or more additional layers of connectivity associated with the second external circuit element including the layer with the first external circuit element, wherein the second external circuit element is a flip-flop storage element indirectly interfacing with the identified input or output pin through the first external circuit element.

9. The method of claim 8, wherein pruning the single level flat model further comprises:

identifying an external circuit element to be pruned from the single level flat model, the external circuit element to be pruned indirectly interfacing with an input or output pin of the identified block, wherein the external circuit element to be pruned is a storage element; and replacing the pruned external circuit element with a capacitor having input capacitance of a corresponding clock pin, the capacitance of the corresponding clock pin equivalent to the pruned external circuit element, the capacitor preserving the IC's network infrastructure during timing analysis.

10. The method of claim 9, wherein the pruned external circuit element is one of a flip-flop element or a latch element.

11. The method of claim 9, wherein generating the RDM for the identified block further including generating a pruned RDM netlist and pruned RDM DSPF file for the identified block, the pruned RDM netlist and pruned RDM DSPF file of the identified block is generated using a Tool Command Language (TCL) interface.

12. The method of claim 11, further including replacing the identified block with the generated RDM in the design model of the IC, the replacement including replacing a netlist and DSPF file associated with the identified block with the pruned RDM netlist and pruned RDM DSPF file for the identified block.

13. A method for generating a reverse donut model (RDM) for a block in an integrated circuit chip (IC) using a computer-aided design tool (CAD tool), comprising:

obtaining connectivity information associated with a hierarchical model of the IC including connectivity information associated with a plurality of blocks, wherein each of the plurality of blocks includes one or more sub-blocks and one or more circuit elements with interconnections between the sub-blocks and circuit elements, each of the sub-blocks includes one or more circuit elements, each of the plurality of blocks includes an outer input-output (IO) pin layer with a plurality of input and output pins to interface with circuit elements both inside and outside the block, the connectivity information provided by a netlist;

obtaining parasitic data associated with interconnections of the plurality of circuit elements and blocks of the IC, the parasitic data provided by a detailed standard parasitic format (DSPF) file;

flattening the hierarchical model of the IC to a single level flat model using the information from the netlist and DSPF file, the single level flat model retaining all the blocks and circuit elements including connectivity and other related information of the IC;

identifying a block from the plurality of blocks in the single level flat model of the IC, the identified block including logic associated with the plurality of input and output pins in the outer IO pin layer for interfacing with external circuit elements of the IC;

initializing a timer associated with the IC;

defining a plurality of timing constraints associated with each of the plurality of input and output pins of the IC; and generating the RDM of the identified block by retaining connectivity information associated with an outer boundary of the identified block and at least one layer of interface connection between each of the input and output pins of the identified block and at least one circuit element external to the identified block in the IC interfacing with each of the input and output pins in the outer boundary of the identified block, wherein the generating of the RDM includes pruning the single level flat model of the IC, the generated RDM preserving essential performance characteristics of the identified block and acting as a blackbox for the identified block, the generated RDM replacing the identified block in the IC for running the timing analysis and wherein the method operations are performed using a processor.

14. The method of claim 13, wherein flattening the hierarchical model of the IC to a single level flat model is reducing the hierarchical model of the IC to a library element level.

15. The method of claim 13, wherein the external circuit element is one of a clock network pin, combinatorial logic including a logic gate or a multiplexer, a storage element including a flip-flop or a latch, a blackbox of another block or sub-block, wherein the blackbox of another block including one or more storage elements within with a combinatorial arc connecting an input to an output of the blackbox.

16. The method of claim 15, wherein the defined timing constraints for the identified block replaces any previously defined timing constraints for the identified block.

17. The method of claim 16, wherein pruning the single level flat model of the IC further including, identifying an outer input-output (IO) pin layer in the outer boundary of the identified block using the connectivity information, the IO pin layer housing the plurality of input and output pins for interfacing with both internal and external circuit elements of the IC;

identifying one or more of the external circuit elements directly or indirectly interfacing with each of the plurality of input and output pins in the IO pin layer of the identified block using the connectivity information;

pruning the single level flat model of the IC so as to preserve the outer IO pin layer and the one or more layers of interface connectivity information between each of the plurality of input and output pins in the IO pin layer and one or more of the identified external circuit elements, the external circuit element being a flip flop, and creating a pruned RDM netlist and a pruned RDM DSPF file for the identified block, the pruned netlist and the pruned DSPF file for the identified block providing the connectivity and parasitic data information for the identified block, wherein the pruned RDM netlist and pruned RDM DSPF file together form the RDM of the identified block.

18. The method of claim 17, further including, identifying an external circuit element to be pruned from the single level flat model, the external circuit element to be pruned indirectly interfacing with an input or an output pin of the identified block, wherein the pruned external circuit element is a storage element; and replacing the pruned external circuit element with a capacitor having input capacitance of a corresponding clock pin, the capacitance of the corresponding clock pin equivalent to the pruned external circuit element, the replaced capacitor preserving network infrastructure of the IC during a timing analysis.

19. The method of claim 18, further including replacing the identified block in the IC with the generated RDM by replacing a netlist and DSPF file associated with the identified block with the pruned RDM netlist and pruned RDM DSPF file of the corresponding RDM, the generated RDM providing substantially similar timing results as the identified block during timing analysis.

20. A pruning algorithm to generate a reverse donut model (RDM) for a block within an integrated circuit chip (IC), the pruning algorithm implemented in a simulation tool that is configured to execute on a computer system for performing analysis, the pruning algorithm comprising:

(i) a flattener module configured to, flatten a hierarchical model of the IC to a single level flat model, the IC including a plurality of blocks, each of the plurality of blocks having one or more sub-blocks and one or more circuit elements arranged in a hierarchical structure, each of the sub-blocks including one or more circuit elements, wherein the single level flat model retaining all connectivity, parasitic data and other related information associated with each of the plurality of circuit elements and blocks within the IC;

identify a block from the plurality of elements and blocks in the single level flat model;

(ii) a timer module configured to, initialize timing constraints associated with the IC;

define a plurality of timing constraints associated with each of a plurality of input and output pins of the identified block of the IC, the timing constraints providing timing data associated with the identified block; and (iii) a generator module configured to, interact with the flattener module to obtain list of circuit elements, blocks, connectivity and other related information for the identified block;

interact with the timer module to obtain timing constraints associated with the identified block;

prune the single level flat model of the IC to create the RDM for the identified block using the connectivity information and timing constraints associated with the identified block, the RDM including connectivity information of an outer input-output (IO) pin layer of the identified block and at least one layer of interface connection between each of a plurality of input and output pins in the IO pin layer of the identified block and a first external circuit element interfacing with each of the plurality of input and output pins, the RDM preserving essential performance characteristics of the identified block and acting as a blackbox for the identified block replacing the identified block during timing analysis, wherein the first external circuit element is a storage element, the storage element being one of a flip flop or a latch.

21. The pruning algorithm of claim 20, wherein the flattener module interacts with, a top level verilog and DSPF file to obtain a top level connectivity and parasitic data related information of the IC, wherein the parasitic data includes resistance, capacitance, inductance and other related information associated with interconnections between the plurality of circuit elements and blocks in the IC;

a block level verilog and DSPF file to obtain a block level connectivity and parasitic data related information of all the blocks in the IC excluding the identified block and associated sub-blocks and circuit elements;

a Timing library format file (TLF/LIB) for obtaining timing and logical information associated with the IC; and a TLF/LIB file for the identified block to provide timing and logical information associated with the identified block, wherein the information obtained from the verilog, DSPF file, TLF/LIB is used to generate the RDM for the identified block.

22. The pruning algorithm of claim 21, wherein the timing constraints from the timing constraint module replaces any previously defined timing constraints for the identified block.

* * * * *